US006971629B2

(12) United States Patent
Okada et al.

(10) Patent No.: US 6,971,629 B2
(45) Date of Patent: Dec. 6, 2005

(54) CONTROL VALVE AND METHOD OF MAKING THE SAME

(75) Inventors: Satoru Okada, Gifu-ken (JP); Takayuki Sakai, Gifu-ken (JP); Takaaki Ichikawa, Gifu-ken (JP)

(73) Assignee: Pacific Industrial Co., Ltd., Gifu-ken (JP)

( * ) Notice: Subject to any disclaimer, the term of this patent is extended or adjusted under 35 U.S.C. 154(b) by 0 days.

(21) Appl. No.: 10/627,382

(22) Filed: Jul. 25, 2003

(65) Prior Publication Data

US 2004/0188651 A1 Sep. 30, 2004

(30) Foreign Application Priority Data

Mar. 27, 2003 (JP) ............................ 2003-087361

(51) Int. Cl.[7] ............................................... F16K 17/06
(52) U.S. Cl. ................................................ 251/129.15
(58) Field of Search .................................. 251/129.15

(56) References Cited

U.S. PATENT DOCUMENTS 4,750,709 A * 6/1988 Kolenc et al. ........... 251/335.2
5,613,836 A 3/1997 Takenaka et al.
6,302,656 B1 10/2001 Hirota

FOREIGN PATENT DOCUMENTS

EP 0 992 684 A2 4/2000
JP 11-218078 8/1999
JP 2000-120912 4/2000

* cited by examiner

*Primary Examiner*—J. Casimer Jacyna
(74) *Attorney, Agent, or Firm*—Akin Gump Strauss Hauer & Feld, LLP

(57) ABSTRACT

A control valve is disclosed in which a direct-moved shaft having one end abutted against a diaphragm is direct moved according to deformation of the diaphragm so that a valve element mounted on the other end of the direct-moved shaft is adhered to and separated from an opening edge of a passage, thereby controlling a flow rate of a fluid passing through the passage. The control valve includes a first body enclosing the direct-moved shaft, a second body enclosing the diaphragm, a compressive elastic member deformed when the second body is pressed against the first body, and a holder for holding the second body on the first body while the compressive elastic member is deformed by compression.

19 Claims, 10 Drawing Sheets

CONTROL VALVE AND METHOD OF MAKING THE SAME

BACKGROUND OF THE INVENTION

1. Field of the Invention

This invention relates to a control valve including a valve element actuated on the basis of reaction of a diaphragm thereby to open and close a fluid passage, and a method of making the control valve.

2. Description of the Related Art

FIG. 10 illustrates one of conventional control valve of the above-described type which is designated by reference numeral "1." The control valve 1 includes a pressure-sensitive unit 2 assembled to one end of a body 3. A plunger 4 enclosed in the body 3 has one of two ends which is abutted against the pressure-sensitive unit 2. A valve element 5 is provided at the side of the other end of the plunger 4 so as to be adhered to and separated from an opening edge 6A of a fluid passage 6. Bellows 8 are provided in the pressure-sensitive unit 2.

When the plunger 4 is moved to the pressure-sensitive 2 side, the valve element 5 is abutted against the opening edge 6A of the passage 6, thereby closing the passage. On the other hand, when the plunger 4 is moved to the valve element 5 side, the valve element 5 is separated from the opening edge 6A of the passage 6, thereby opening the passage. The body 3 is provided with a control passage 7 via which pressure of a control fluid is applied to the pressure-sensitive unit 2 from the plunger 4 side. The valve element 5 is actuated together with the plunger 4 on the basis of the pressure of the control fluid and a spring force of the pressure-sensitive unit 2, thus the passage 6 is opened and closed. For example, JP-A-11-218078 discloses one of the control valves of the above-described type.

The aforesaid conventional control valve 1 is provided with the bellows 8 enclosed in the pressure-sensitive unit 2. Since the bellows 8 are expensive, the development of a control valve which is provided with a diaphragm instead of the bellows has been desired. However, when a diaphragm is provided in the pressure-sensitive unit 2 in the above-described control valve 1, the spring force of the unit 2 applied to the plunger 4 varies with variations in a dimension L1 from the unit 2 to the opening edge 6A of the passage 6 and a dimension L2 from the end of the plunger 4 to the valve element 5, whereupon the product accuracy and quality become unstable.

SUMMARY OF THE INVENTION

Therefore, an object of the present invention is to provide a control valve which has an improved stability in the product accuracy and quality as compared with the conventional control valves and a method of making the same.

The present invention provides a control valve in which a direct-moved shaft having one of two ends abutted against a diaphragm is direct moved according to deformation of the diaphragm so that a valve element provided on the other end of the direct-moved shaft is adhered to and separated from an opening edge of a passage, thereby controlling a flow rate of a fluid passing through the passage. The control valve comprises a first body enclosing the direct-moved shaft therein, a second body enclosing the diaphragm therein, a compressive elastic member deformed by compression when the second body is pressed against the first body, and a holder for holding the second body on the first body while the compressive elastic member is deformed by compression.

The invention also provides a method of making a control valve in which a direct-moved shaft having one of two ends abutted against a diaphragm is direct moved according to deformation of the diaphragm so that a valve element provided on the other end of the direct-moved shaft is adhered to and separated from an opening edge of a passage, thereby controlling a flow rate of a fluid passing through the passage. The method comprises provisionally assembling first and second bodies together, positioning the second body so that the direct-moved shaft is operated while a predetermined fluid pressure is applied to the diaphragm, and fixing the second body to the first body.

Variations may sometimes be in each of a dimension from the diaphragm to the opening edge of the fluid passage and a dimension from the valve element to the distal end of the direct-moved shaft at the diaphragm side. However, the variations can be eliminated by the adjustment of the position where the second body is assembled to the first body. Furthermore, when the first and second bodies are assembled together, the compressive elastic member is elastically deformed such that plays between components of the first and second bodies are eliminated by the spring force resulting from the elastic deformation. The second body having thus been assembled to an optimum position where the plays are eliminated is held on the first body by the holder, whereupon a pressing force of the diaphragm against the direct-moved shaft is approximated to a designated value. Consequently, the invention can provide a control valve which has an improved stability in the product quality as compared with the conventional control valves.

According to the above-described method, the first and second bodies are provisionally assembled together. The second body is then positioned so that the direct-moved shaft is operated while a predetermined fluid pressure is applied to the diaphragm. Thereafter, the second body is fixed to the first body. Consequently, since a pressing force of the diaphragm against the direct-moved shaft is approximated to a designated value, the invention can provide a control valve which has an improved stability in the product accuracy and quality as compared with the conventional control valves.

The pressing force produced by the diaphragm at the time of opening or closure of the valve element can be changed when the magnetic force of the solenoid causes an axial force with respect to the direct-moved shaft.

BRIEF DESCRIPTION OF THE DRAWINGS

Other objects, features and advantages of the invention will become clear upon reviewing the following description of embodiments, made with reference to the accompanying drawings, in which.

DETAILED DESCRIPTION OF THE INVENTION

Figure 1:
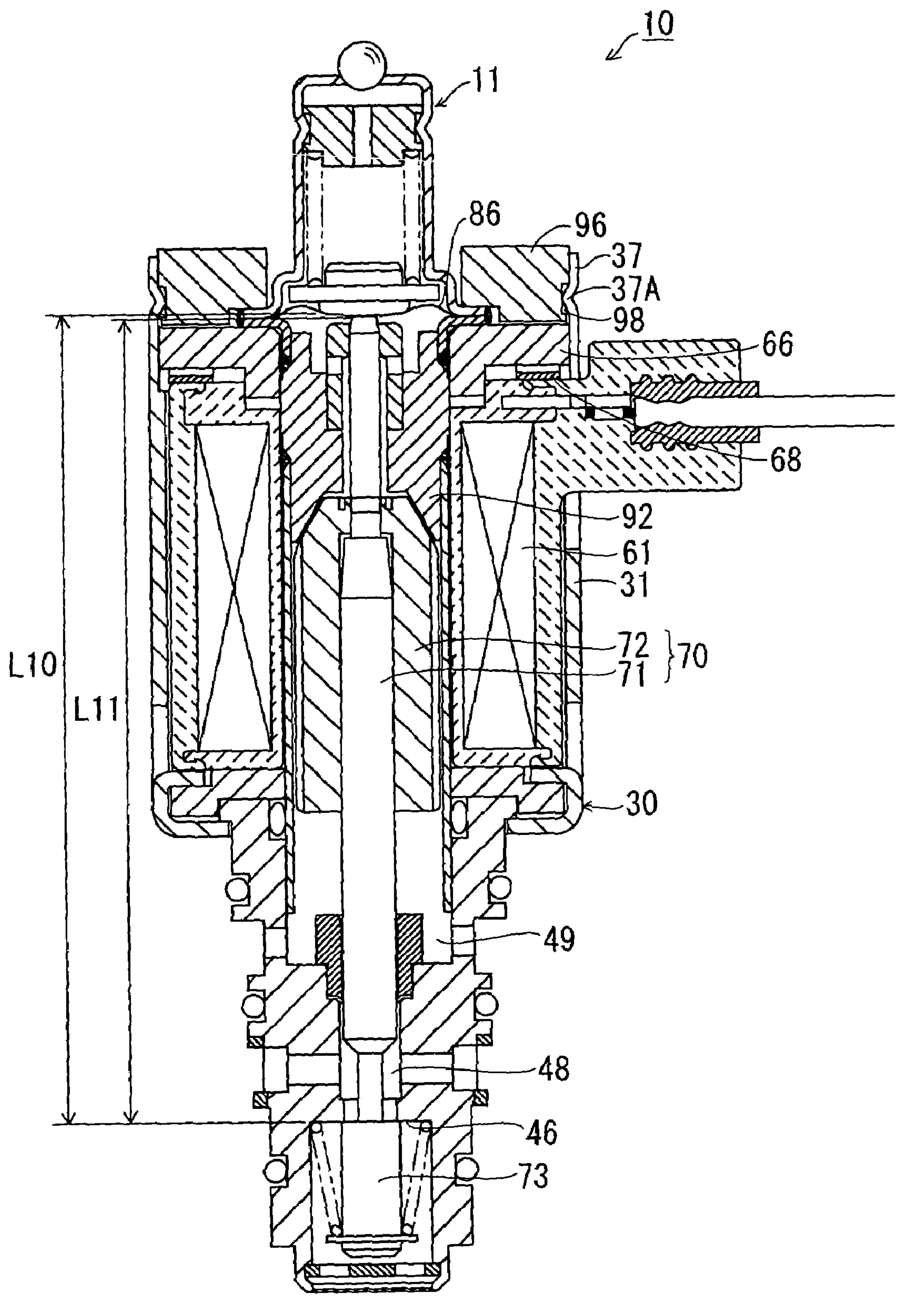
FIG. 1 is a side sectional view of a control valve of a first embodiment in accordance with the present invention.
Figure 3:
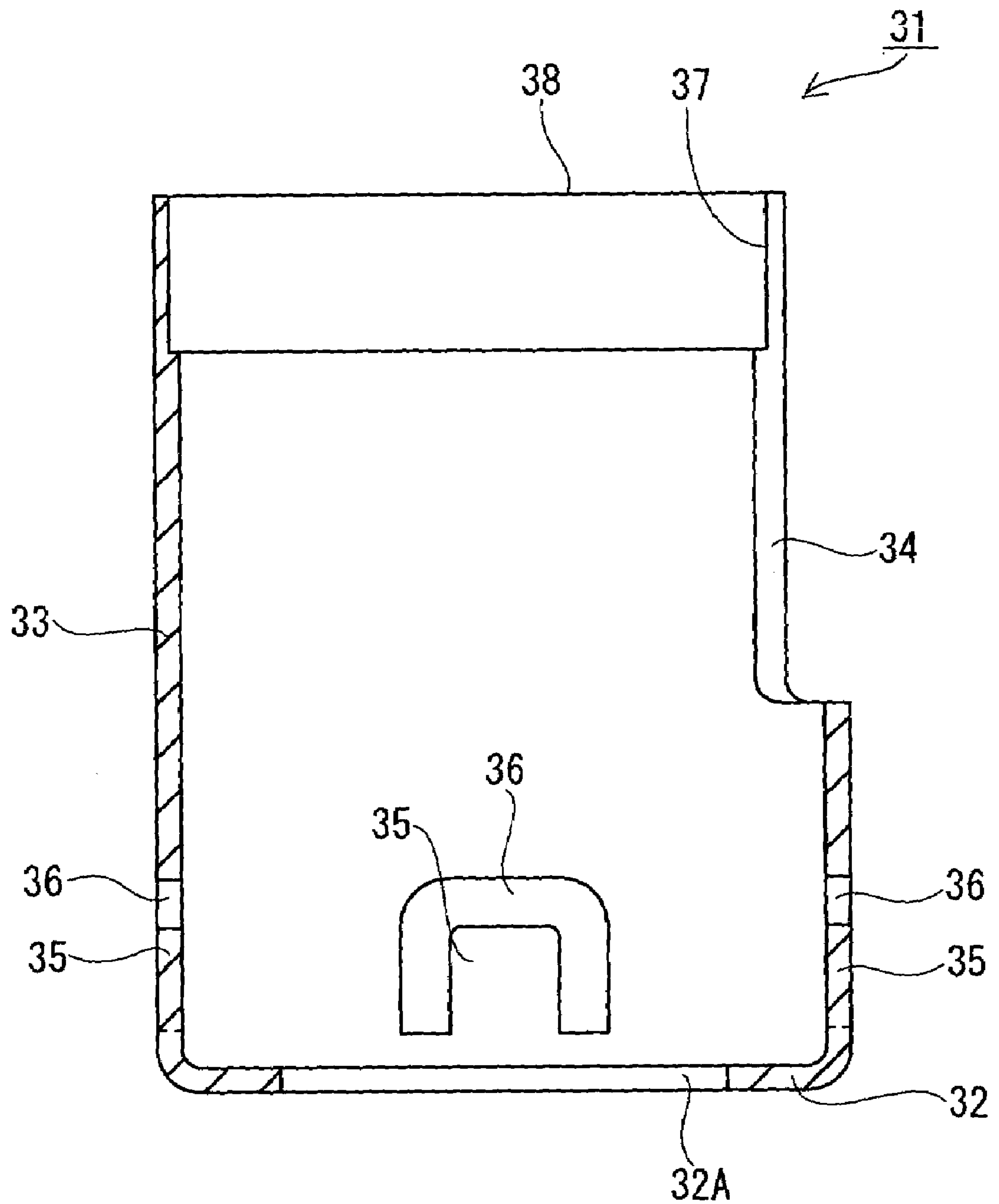
FIG. 3 is a side sectional view of an outer cylinder mounted on the control valve.
Figure 4:
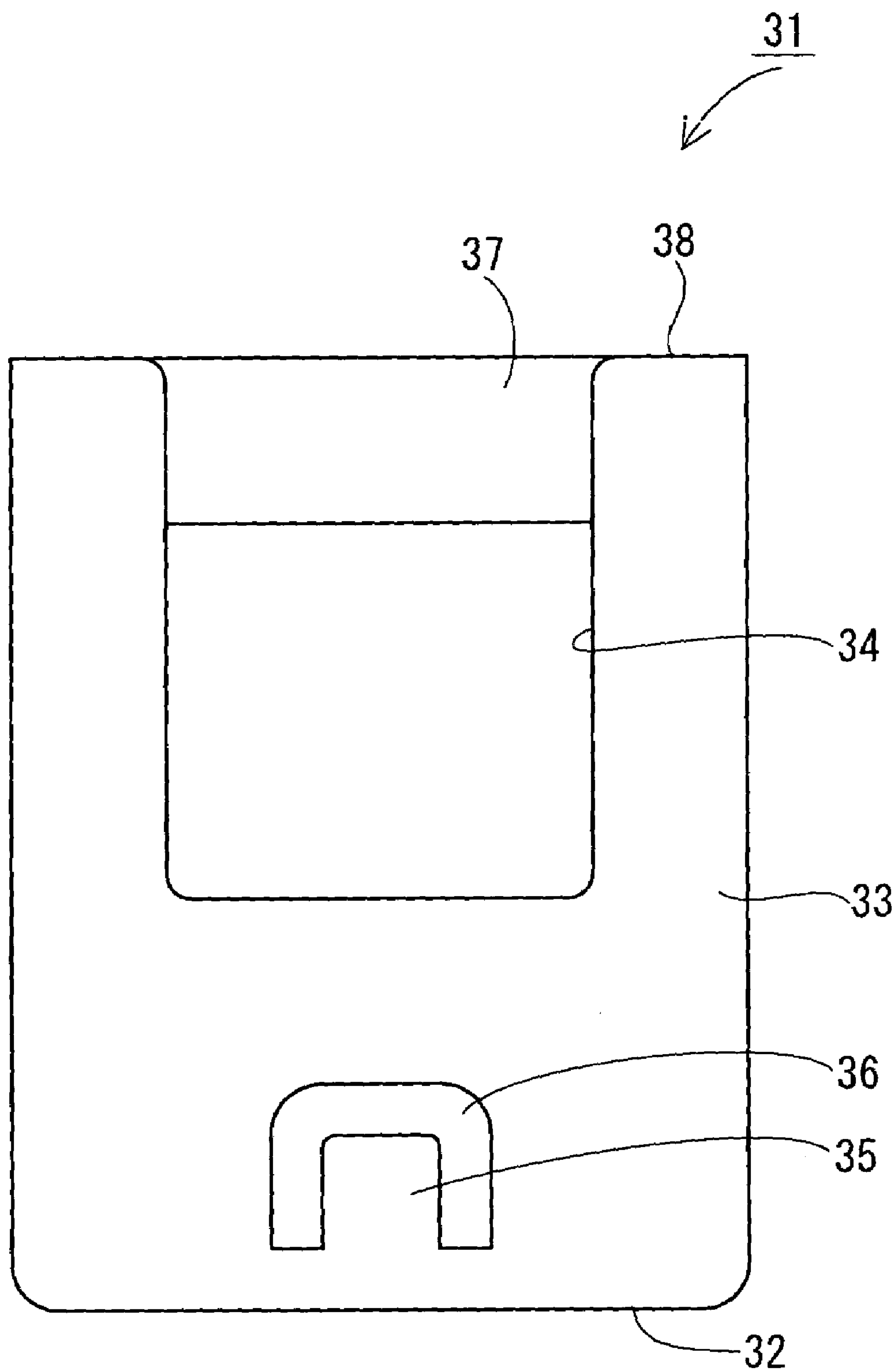
FIG. 4 is a side view of the outer cylinder.

One embodiment of the present invention will be described with reference to FIGS. 1 to 8. A control valve 10 of the embodiment is used in, for example, a variable capacity compressor provided in a car air-conditioner. The control valve 10 includes a first body 30 and a second body 11 both assembled together as shown in FIG. 1. The first body 30 is generally cylindrical in shape and has an outer face with which an outer cylinder 31 is fitted. The outer cylinder 31 is also generally cylindrical in shape and has an open end 38 and a bottom wall 32 as shown in FIG. 3. The bottom wall 32 has a centrally located bottom hole 32A. The outer cylinder 31 further has a circumferential wall 33 including a thinner cylindrical portion 37 formed by spreading an inner face at the open end 38 side. The circumferential wall 33 further includes a recess 34 open at the open end 38 side as shown in FIG. 4.

The circumferential wall 33 has a plurality of, for example, four axial engaging claws 35 formed on an end thereof located near the bottom wall 32. In forming each claw 35, a generally gate-shaped slit 36 is formed in the circumferential wall 33 such that a part of the wall extends, as a protrusion, from the bottom wall 32 side toward the opposite end. A passage sleeve 40 extends through the bottom hole 32A of the bottom wall 32. More specifically, the passage sleeve 40 includes a flange 41 formed on a rear end thereof. The passage sleeve 40 is inserted into the bottom hole 32A from the open end 38 side of the outer cylinder 31. The flange 41 is abutted against the opening edge of the bottom hole 32A, whereby the passage sleeve 40 is engaged with the bottom wall 32. The passage sleeve 40 has a central shaft hole 42 axially extending therethrough. The shaft hole 42 includes a first larger diameter hole 42A, a smaller diameter hole 42C and a second larger diameter hole 42B formed sequentially in this order from the outer cylinder 33 side.

The passage sleeve 40 has a stepped portion formed between the first larger diameter hole 42A and the smaller diameter hole 42C. An annular packing gland 43 is fitted in the stepped portion. A washer-like packing (not shown) is held between an innermost face of the stepped portion and an end face of the packing gland 43. A rod 71 which will be described in detail later extends through the packing 43 and packing gland so that communication between the holes 42A and 42C is prevented. The passage sleeve 40 further has a first side hole 44 through which an interior of the first larger diameter hole 42A communicates with the outside and a second side hole 45 through which a middle interior of the smaller diameter hole 42C communicates with the outside. The second side hole 45 and the smaller diameter hole 42C constitute a switching passage 48. A valve element 73 which will be described in detail later is adhered to and separated from an opening edge of the passage 48 facing the second larger diameter hole 42B. Furthermore, a control passage 49 includes the first side hole 44, the first larger diameter hole 42A and a through hole 94 of a suction member 92 (see FIG. 2).

Figure 5:
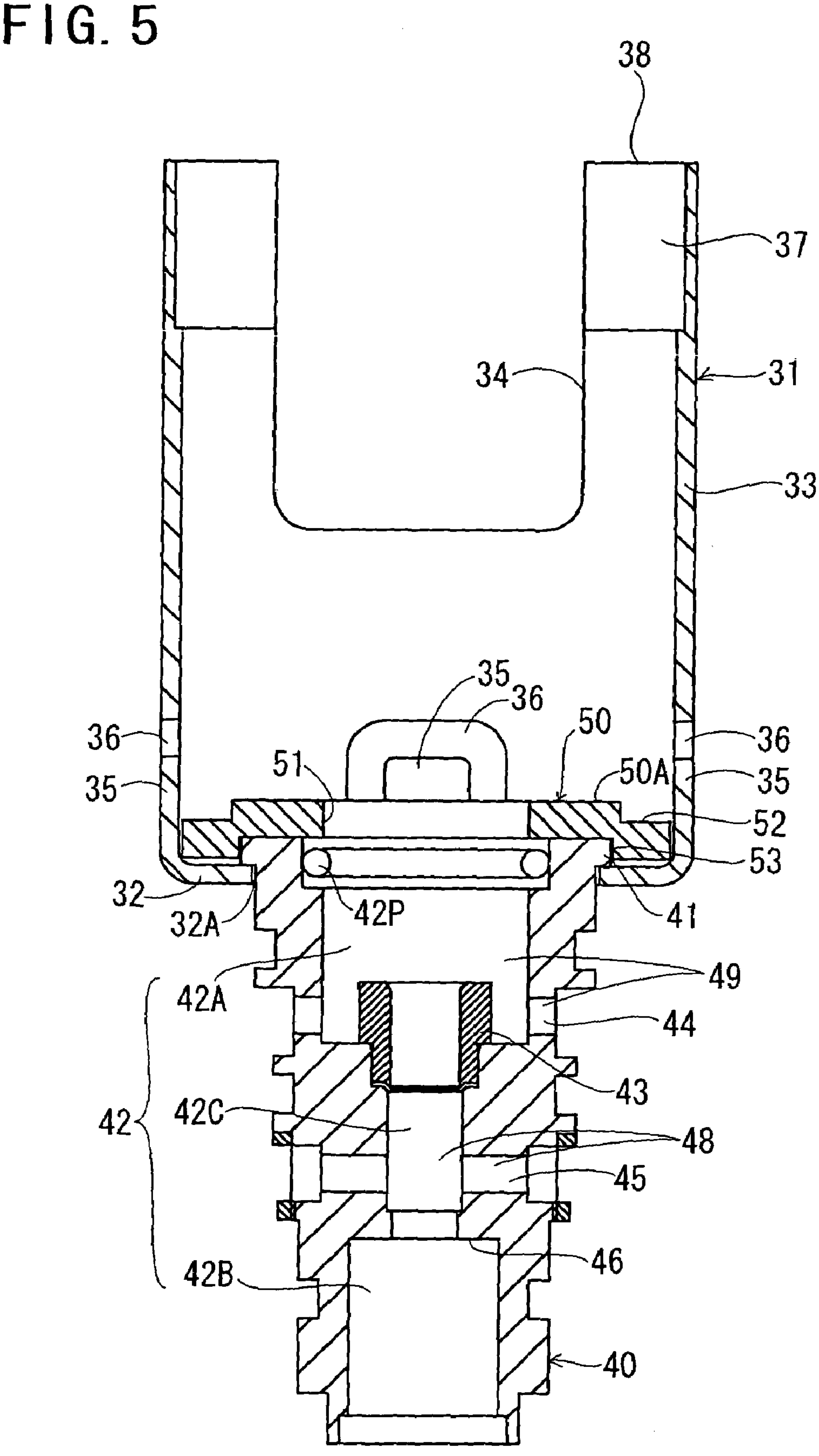
FIG. 5 is a side view of the outer cylinder with a fluid passage cylinder.

A fixing plate 50 is placed on the flange 41 in the outer cylinder 31 as shown in FIG. 5. The fixing plate 50 has a centrally located through hole 51 and a positioning hole 53 formed by depressing a peripheral portion at one of two sides thereof. The flange 41 of the passage sleeve 40 is fitted in the positioning hole 53, so that the passage sleeve 40 and the fixing plate 50 are centered. The fixing plate 50 further has a stepped portion 52 formed by depressing an outer periphery of the other side thereof toward the sleeve 40. The aforesaid engaging claws 35 are pushed down toward the stepped portion 52 such that the flange 41 and the fixing plate 50 are held between the engaging claws 35 and the bottom wall 32 of the outer cylinder 31. The engaging claws 35 having been pushed down are placed in the stepped portion 52 to be located lower than the upper side surface 50A of the fixing plate 50 as shown in FIG. 5.

Figure 2:
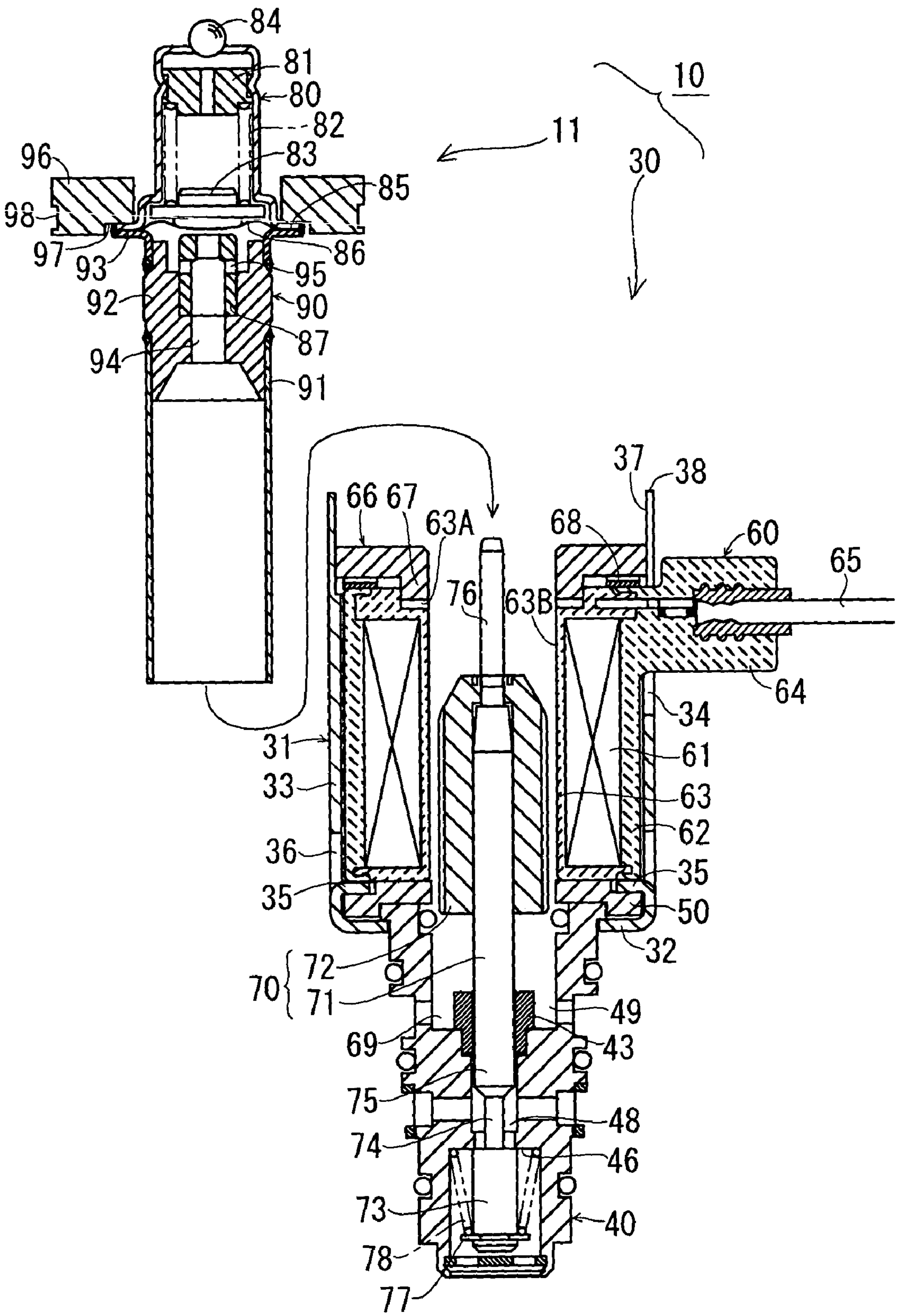
FIG. 2 is an exploded side sectional view of a pressure-sensitive unit and body of the control valve.

A solenoid unit 60 is placed on the fixing plate 50 in the outer cylinder 31 as shown in FIG. 2. The solenoid unit 60 comprises a solenoid 61 wound on a bobbin 63 and a housing 62 covering the solenoid. A connector 64 protrudes sideways from the housing 62 and encloses a terminal of the solenoid 61. A distal end terminal of an electric cable 65 extending from a control section (not shown) is inserted into the connector 64 to be electrically connected to the terminal of the solenoid 61. The solenoid unit 60 has a generally flat lower end face at the fixing plate 50 side. The lower end face of the solenoid 60 is abutted against the fixing plate 50 so that the solenoid unit is positioned in the outer cylinder 31.

The solenoid unit 60 further has a generally upper end face located opposite the fixing plate 50. The upper end face of the solenoid 60 has a central depression 63A formed by depressing an inner periphery of a hole 63B of the bobbin 63. A yoke 66 is placed on the upper end face of the solenoid 60. The yoke 66 has a centrally located through hole matched with the hole 63B. A peripheral edge of the through hole is projected toward the solenoid unit 60 side to be formed into a boss 67. The boss 67 is fitted in the depression 63A and the yoke 66 is fitted in the thinner cylindrical portion 37 of the outer cylinder 31.

Figure 8:
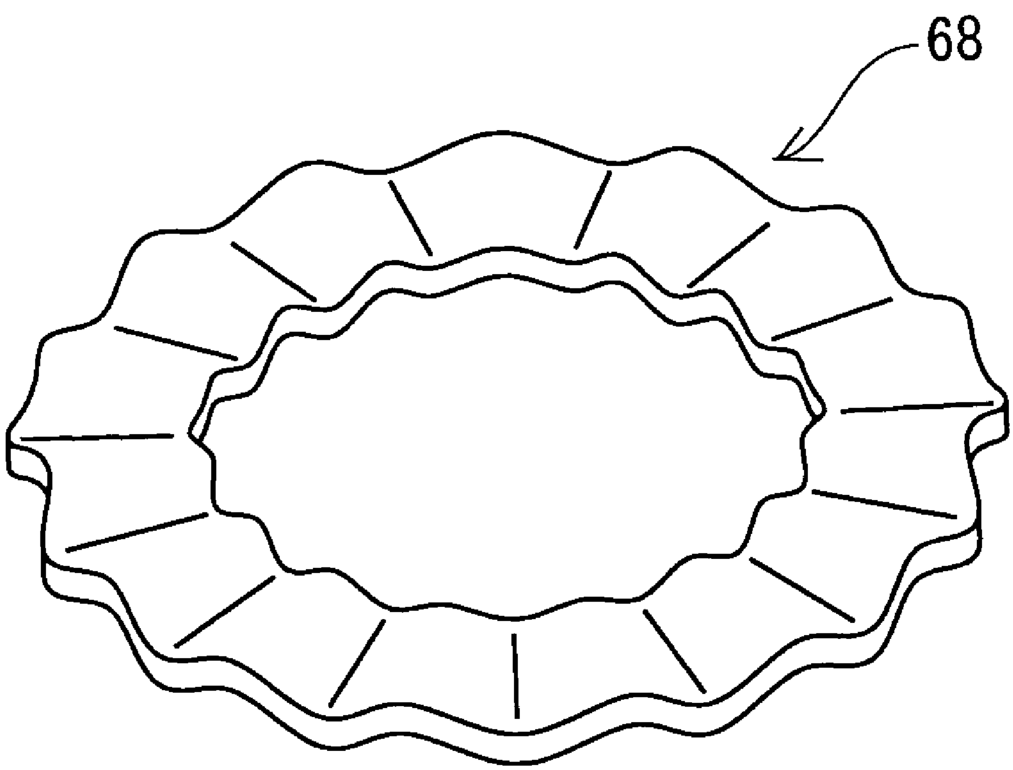
FIG. 8 is a perspective view of a wave washer.

A wave washer 68 serving as a compressive elastic member in the invention is held between the upper end face of the solenoid unit 60 and the yoke 66. The wave washer 68 is formed by corrugating an annular disk as shown in FIG. 8. A distal end face of the boss 67 is not in contact with the bottom of the depression 63A. Consequently, when the yoke 66 is forced toward the solenoid unit 60 side, the wave washer 68 is elastically deformed such that the yoke 66 is moved relative to the solenoid unit 60. As described above, the first body 30 comprises the passage sleeve 40, the fixing plate 50, the solenoid unit 60 and the yoke 66. The central holes of the components 40, 50, 60 and 66 are aligned into a communicating space 69 extending over the interior of the first body 30.

A direct-moved shaft 70 is accommodated in the communicating space 69. The shaft 70 comprises a rod 71 serving as a shaft in the invention and a plunger 72 mounted to the rod. The rod 71 is formed by cutting a metal bar so that the metal bar is axially divided into a plurality of portions having different outer diameters, for example. The portions include a valve element 73, a constriction 74, a body 75 and a distal end 76 arranged sequentially in this order from the passage sleeve 40. The valve element 73 has a larger outer diameter than the other portion of the rod 71. The distal end 76 of the rod 71 is inserted into an open end of the communicating space 69 at the passage sleeve 40 side. The valve element 73 is abutted against an opening edge of a switching passage 48 in the passage sleeve 40. A conical coil spring 78 is provided about the valve element 73 so as to be stretched between an E-ring 77 attached to a distal end of the valve element 73 and a wall of the passage sleeve 40. The plunger 72 is made from a magnetic material and has a central through hole. The plunger 72 is fitted, from the distal end 76 side, with the rod 71 which has been inserted in the first body 30.

The second body 11 comprises a closed case 80 and a guide cylinder 90 both aligned axially. The closed case 80 has an open end and a bottom. The closed case 80 has a circular cylindrical shape, and a flange 85 projecting sidewise from the open end thereof. An adjuster 81, a pressure sensing coil spring 82 and a patch 83 are enclosed in the closed case 80 in this order, and thereafter, a diaphragm 86 is placed on the patch 83 stretched over the open end of the case 80. The diaphragm 86 is made of a metal in the embodiment.

The adjuster 81 has an axial through hole. The adjuster 81 is fixed to the case 80 by crimping a peripheral wall of the case 80. The pressure sensing coil spring 82 is deformed by compression between the adjuster 81 and the patch 83 such that the patch is pressed against the diaphragm 86. Furthermore, the case 80 has an adjusting hole extending through the bottom wall thereof. When the first and second bodies 30 and 11 have been assembled together, the pressure in the closed case 80 is adjusted at a predetermined value (for example, vacuum at zero pressure) and thereafter, the adjusting hole is closed by a sealer 84.

The guide cylinder 90 comprises a cylindrical body 91 secured to one of two ends of a cylindrical attracting element 92 and a flange 93 secured to the other end of the attracting element 92. An outer edge of the diaphragm 86 is placed between the flange 93 and the flange 85 of the closed case 80. In this state, the flanges 85 and 93 and the diaphragm 86 are secured (for example, welded) to them, whereby the diaphragm 86 is fixed, held between the flanges 85 and 93.

The attracting element 92 has a central through hole 94 through which the distal end 76 of the rod 71 extends. The control passage 49 includes the through hole 94, the first side hole 44, the first larger diameter hole 42A and the cylindrical body 91 as described above. Furthermore, a guide sleeve 87 is fitted in an open end of the through hole 94 at the closed case 80 side. The rod 71 is supported by the guide sleeve 87 so as to be directly moved. The guide sleeve 87 has a through hole which is formed in an axially middle portion thereof so as to be open sidewise. Pressure of a fluid filling the control passage 49 is applied via the through hole 95 to the diaphragm 86. The through hole 94 of the attracting element 92 has an opening edge which is opposite the diaphragm 86 and reverse tapered in correspondence with the distal end of the plunger 72.

A holder 96 is attached to the flanges 85 and 93 of the second body 11. The holder 96 is annular in shape and has a depression 97 formed in one side thereof. The flanges 85 and 93 are accommodated in the depression 97. The depression 97 has a depth smaller than a total thickness of the flanges 85 and 93, whereupon the flange 93 projects over the side of the holder 96. The holder 96 has an engagement groove 98 formed in an outer circumference thereof.

Figure 6:
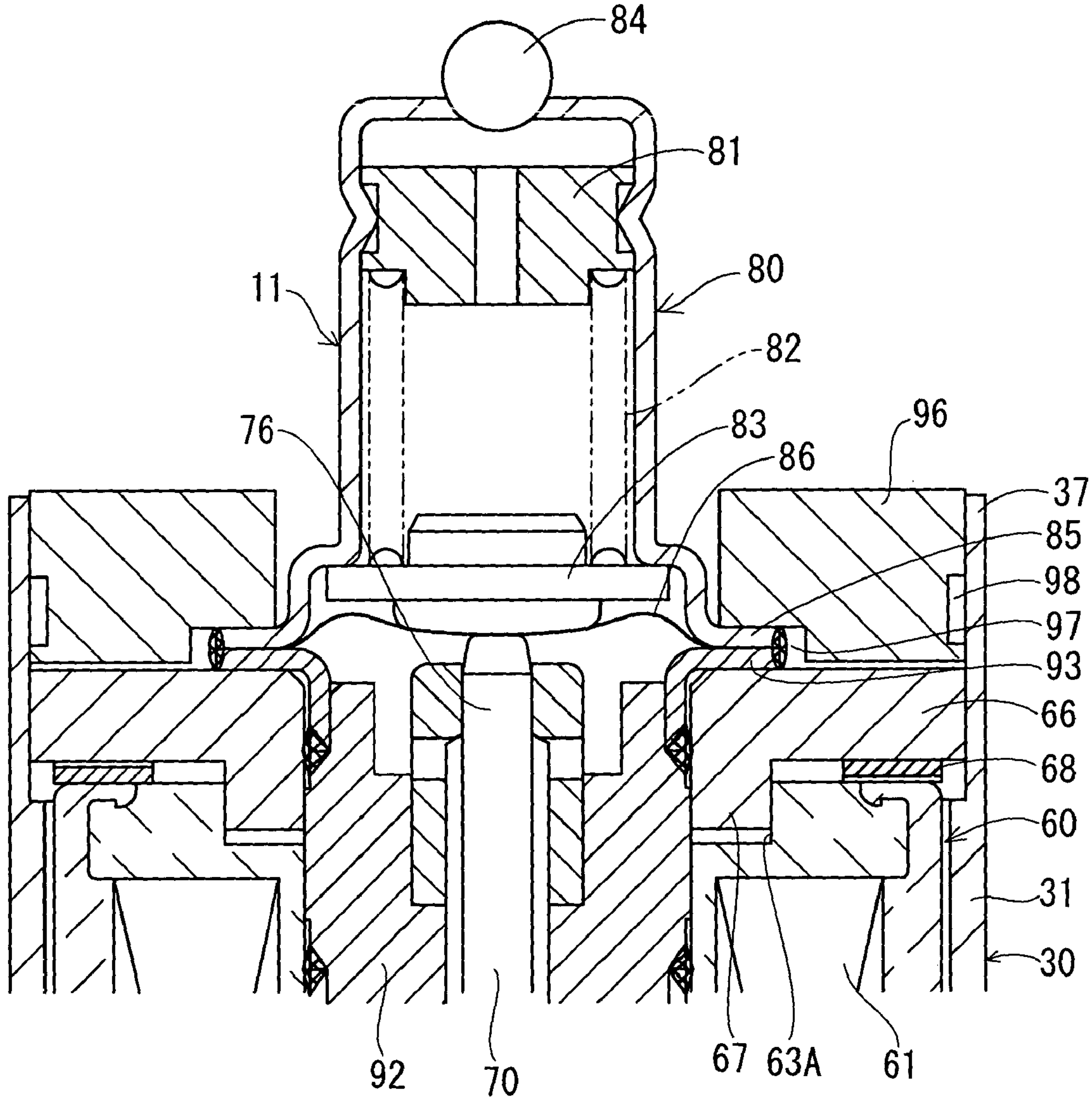
FIG. 6 is a partially enlarged side sectional view of the pressure sensing unit and the body assembled to the unit.
Figure 7:
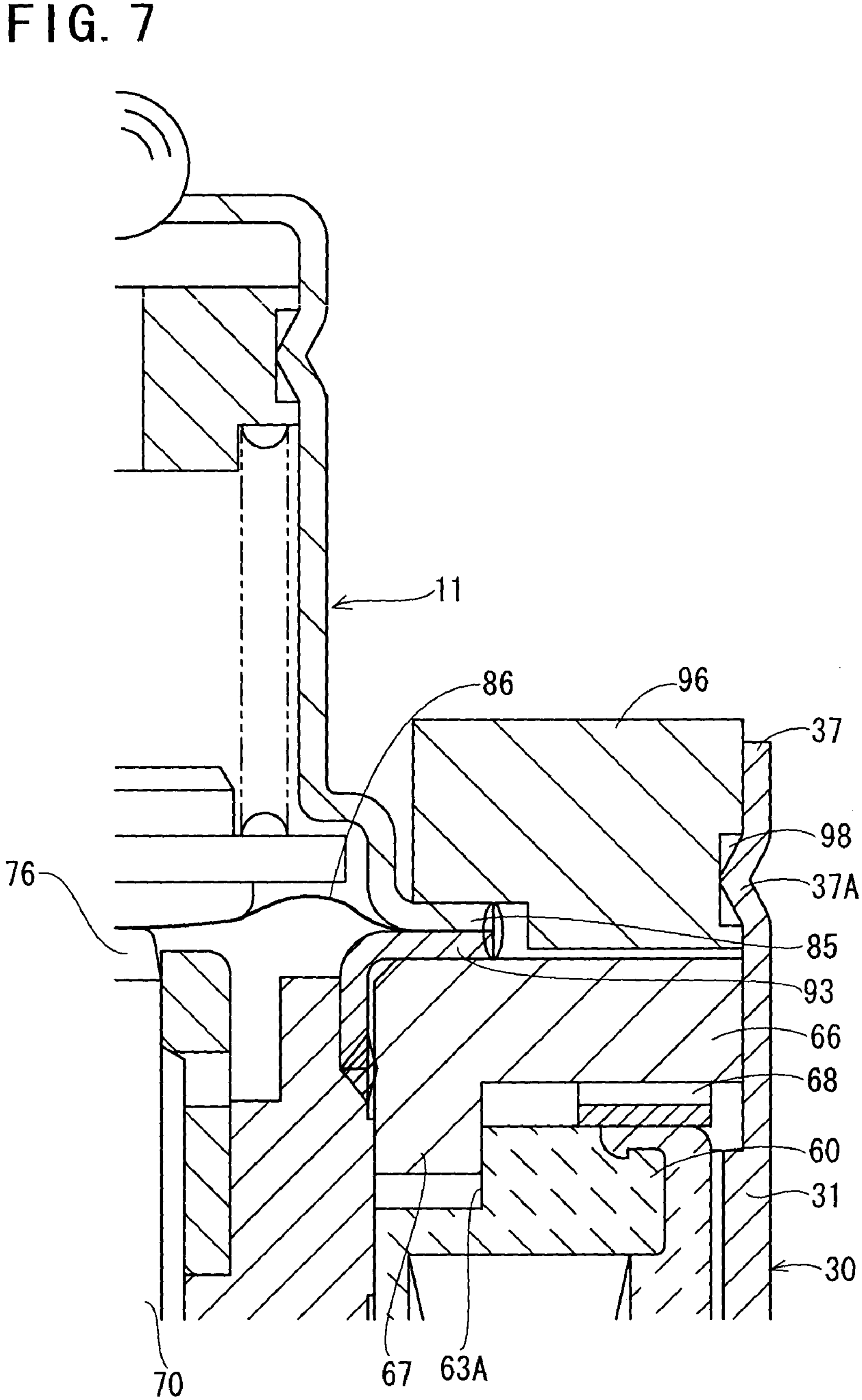
FIG. 7 is a partially enlarged side sectional view of the pressure-sensitive unit and the body assembled to the unit to be engaged therewith.

The first and second bodies 30 and 11 constructed as described above will be assembled in the following manner. The cylindrical body 91 of the second body 11 is fitted into the hole 63B of the solenoid unit of the first body 30. The flange 93 of the second body 11 then abuts the flat face of the yoke 66 of the first body 30 as shown in FIG. 6. Furthermore, the flanges 85 and 93 of the second body 11 are held between the yoke 66 and the holder 96. When the second body 11 is pressed against the first body 30, the wave washer 68 is deformed by compression such that the position of the second body 11 is changed relative to the first body 30.

The solenoid 61 is then excited so that a magnetic circuit is composed by the solenoid 61, yoke 66, attracting element 92 and plunger 72 electrically connected to one another, whereupon the plunger 72 is attracted to the attracting element 92 side. The fluid with the predetermined pressure is supplied to the control passage 49. An amount of pressure applied to the first body 30 by the second body 11 is changed while the fluid is being supplied to the control passage 49, so that, for example, the second body 11 is held at a position where the shaft 70 is depressed by the diaphragm 86 thereby to be operated. The thinner cylindrical portion 37 of the outer cylinder 31 is crimped inside. An engagement protrusion 37A (engaging means in the invention) formed as the result of crimping is engaged with the engagement groove 98 of the holder 96 (see FIG. 1). Finally, the pressure in the closed case 80 is adjusted to a predetermined value (for example, vacuum at zero pressure), and the adjusting hole is closed by the sealer 84, whereby the control valve 10 is completed.

In the foregoing embodiment, the outer cylinder 31 includes the thinner cylindrical portion 37 in order that a part of the outer cylinder 31 may easily be crimped. However, a part of the outer cylinder 31 may be crimped without provision of any thinner cylindrical portion 37, whereupon the production cost for forming the thinner cylindrical portion can be eliminated.

When the above-described control valve 10 is provided in a variable capacity compressor (not shown) and started, the shaft 70 is attracted to the second body 11 side by the magnetic force of the solenoid 61. When the fluid supplied to the control passage 49 has pressure larger than the predetermined value, the diaphragm 86 is pressed by the pressure to the closed case 80 side, so that the valve element 73 of the shaft 70 is held in abutment with the opening edge 46 of the switching passage 48. Consequently, the switching passage 48 joining two chambers of the variable capacity compressor is closed.

When the pressure of fluid supplied in the control passage 49 is reduced to or below the predetermined value, the diaphragm 86 is accordingly expanded to the shaft 70 side, thereby pressing the latter. Consequently, the valve element 73 is separated from the opening edge of the switching passage 48 thereby to open the switching passage, whereupon the fluid flows between the two chambers of the compressor (not shown).

Variations may sometimes be in each of a dimension L10 from the diaphragm 86 to the opening edge of the switching passage 48 and an axial dimension L11 from the valve element 73 to the distal end of the direct-moved shaft 70 at the diaphragm 86 side. However, the variations can be eliminated by the adjustment of the position where the second body 11 is assembled to the first body 30. Furthermore, when the first and second bodies 30 and 11 are assembled together, the wave washer 68 is elastically deformed such that plays between components of the first and second bodies 30 and 11 are eliminated by the spring force resulting from the elastic deformation. The second body 11 having thus been assembled to an optimum position where the plays are eliminated is held on the first body by the engagement protrusion 37A, whereupon the pressing force of the diaphragm 86 against the shaft 70 is approximated to a set value. Consequently, the invention can provide a control valve having an improved stability in the product accuracy and quality as compared with the conventional control valves.

Figure 10:
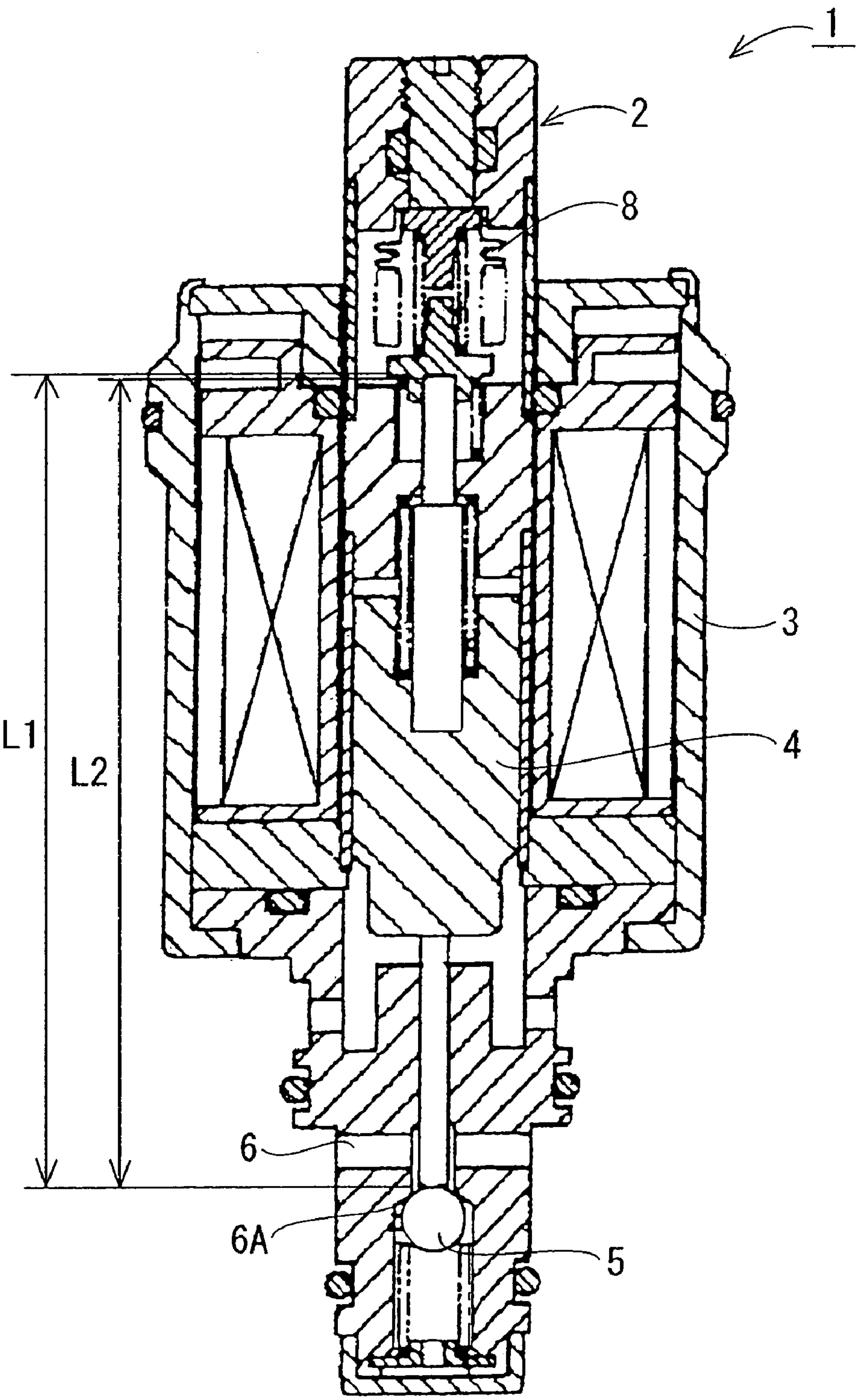
FIG. 10 is a side sectional view of a conventional control valve.

In the conventional control valves, two shafts assembled to both ends of the plunger (designated by reference numeral "4" in FIG. 10) are supported to be direct-moved respectively. Accordingly, the plunger could not be moved smoothly since each shaft is inclined relative to the plunger. In the control valve 10 of the embodiment, however, the direct-moved shaft 70 includes the rod 71 having both ends which are supported by the cylindrical sealing member 43 and the guide sleeve 87 so as to be direct moved respectively. Thus, the direct-moved shaft 70 can be moved smoothly since the rod 71 is supported at two points and accordingly, the inclination of the direct-moved shaft 70 is limited.

Figure 9:
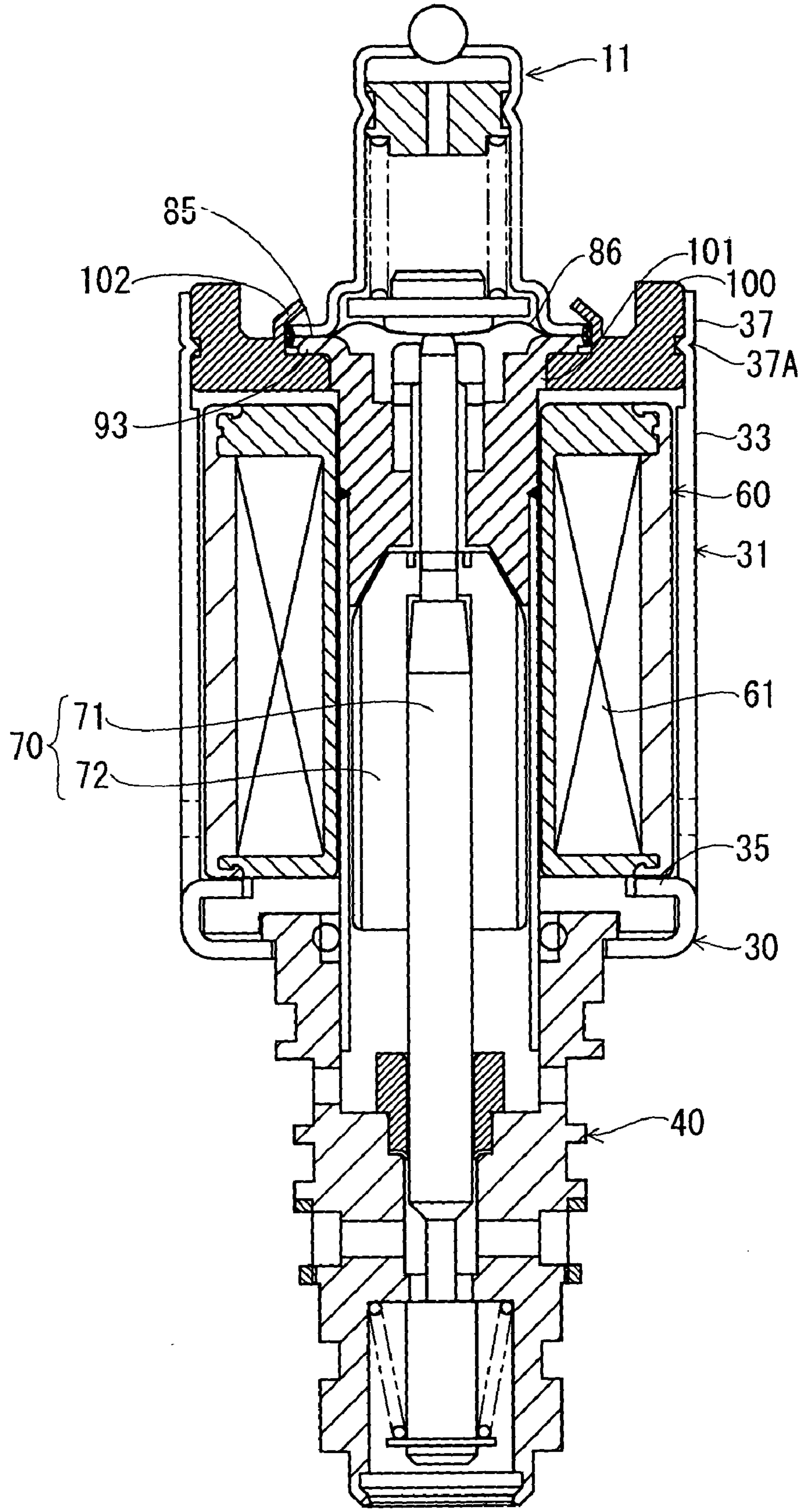
FIG. 9 is a side sectional view of the control valve of a second embodiment in accordance with the present invention.

FIG. 9 illustrates a second embodiment of the invention. Only the difference between the first and second embodiments will be described. Identical or similar parts are labeled by the same reference numerals in the second embodiment as those in the first embodiment and the description of these parts will be eliminated.

In the second embodiment, the solenoid 60 is fixed in the outer cylinder 31, for example, by an adhesive agent. The second body 11 is assembled to the first body 30 from above the solenoid unit 60 without provision of the wave washer 68 and the yoke 66. The second body 11 is inserted through a through hole 101 of a holder 100 from the attracting element 92 side. A cylindrical wall 102 of the holder 100 is pressed to fall down to the side of the flanges 85 and 93 of the second body 11 while the flanges 85 axis 93 are in abutment with the edge of the hole 101, whereby the holder 100 is fixed integrally with the second body 11.

The wave washer 68 may be provided between the holder 100 and the solenoid unit 60 in the control valve of the second embodiment although no wave washer is used in the second embodiment. Furthermore, the holder 100 performs the function of the yoke 66 provided in the control valve of the first embodiment.

In order that the second body 11 may be assembled to the first body 30, the holder 100 is inserted into the thinner cylindrical portion 37 together with the second body 11. The holder 100 is arranged at a position where a counterforce of the diaphragm 86 becomes suitable, in the same manner as in the first embodiment. The cylindrical portion 37 is crimped inward so as to serve as the engagement protrusion 37A, which is engaged with the engagement groove 98 formed in an outer circumference of the holder 100. The same effect can be achieved from the second embodiment as from the first embodiment.

The wave washer 68 is used as the compressive elastic member in the first embodiment. However, the compressive elastic member should not be limited to the wave washer. A coil spring or rubber plate may be used as the compressive elastic member, instead.

The direct-moved shaft 70 includes the single rod 71 and the plunger 72 assembled to the rod in the foregoing embodiments. However, two rods may be assembled to both ends of the plunger respectively, instead.

In the foregoing embodiments, the second body 11 is held on or fixed to the first body 30 by the engagement protrusion 37A formed by crimping the thinner cylindrical portion 37 inward. However, the holding means should not be limited to the engagement protrusion 37A. For example, a screw may be screwed through the thinner cylindrical portion 37, instead. Alternatively, a bonding agent may be applied between the first and second bodies 30 and 11 to serve as the holding means.

The above description contains the construction of the control valves 10, 11 of the present invention. In summary, the control valves 10, 11 have a direct-moved shaft 70 having one of two ends abutted against a diaphragm 86 where the shaft 70 is moved according to the deformation of the diaphragm 86 so that a valve element 73 provided on the other end of the direct-moved shaft 70 is adhered to and separated from an opening edge 46 of a passage 48. The flow rate of a fluid passing through the passage 48 is controlled in this manner.

The control valves 10, 11 are manufactured using a method comprising the steps of provisionally assembling first and second bodies 30, 11 together, positioning the second body 11 so that the direct-moved shaft 70 is operated while a predetermined fluid pressure is applied to the diaphragm 86, and fixing the second body 11 to the first body 30. Consequently, since a pressing force of the diaphragm 86 against the direct-moved shaft 70 is approximated to a designated value, the invention provides a control valve with improved stability, accuracy and quality compared to conventional control valves.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A control valve in which a direct-moved shaft having one of two ends abutted against a diaphragm which is deformable by fluid pressure, the direct-moved shaft being moved in response to deformation of the diaphragm so that a valve element provided on the other end of the direct-moved shaft is adhered to and separated from an opening edge of a passage, thereby controlling a flow rate of a fluid passing through the passage, the control valve comprising:

a first body enclosing the direct-moved shaft therein;

a second body enclosing the diaphragm therein;

a compressive elastic member deformed by compression when the second body is pressed against the first body; and a holder for holding the second body on the first body while the compressive elastic member is deformed by compression.

2. A control valve according to claim 1, further comprising an outer cylinder fitted with an outer face of the first body and having an open end, wherein the second body is fitted in the open end of the outer cylinder, and the holder is formed by projecting a part of the outer cylinder toward the second body side.

3. A control valve according to claim 1, wherein the compressive elastic member is a wave washer formed by corrugating an annular disc.

4. A control valve according to claim 2, wherein the compressive elastic member is a wave washer formed by corrugating an annular disc.

5. A control valve according to claim 1, wherein the direct-moved shaft includes another shaft extending through a center thereof, and said another shaft has both ends mounted on the first or second body so that said another shaft is direct-moved.

6. A control valve according to claim 2, wherein the direct-moved shaft includes another shaft extending through a center thereof, and said another shaft has both ends mounted on the first or second body so that said another shaft is direct-moved.

7. A control valve according to claim 3, wherein the direct-moved shaft includes another shaft extending through a center thereof, and said another shaft has both ends mounted on the first or second body so that said another shaft is direct-moved.

8. A control valve according to claim 4, wherein the direct-moved shaft includes another shaft extending through a center thereof, and said another shaft has both ends mounted on the first or second body so that said another shaft is direct-moved.

9. A control valve according to claim 1, wherein the direct-moved shaft is provided with a magnetic member and the first body is provided with a solenoid operatively associated with the magnetic member to generate magnetic force directed axially with respect to the direct-moved shaft.

10. A control valve according to claim 2, wherein the direct-moved shaft is provided with a magnetic member and the first body is provided with a solenoid operatively associated with the magnetic member to generate magnetic force directed axially with respect to the direct-moved shaft.

11. A control valve according to claim 3, wherein the direct-moved shaft is provided with a magnetic member and the first body is provided with a solenoid operatively associated with the magnetic member to generate magnetic force directed axially with respect to the direct-moved shaft.

12. A control valve according to claim 4, wherein the direct-moved shaft is provided with a magnetic member and the first body is provided with a solenoid operatively associated with the magnetic member to generate magnetic force directed axially with respect to the direct-moved shaft.

13. A control valve according to claim 5, wherein the direct-moved shaft is provided with a magnetic member and the first body is provided with a solenoid operatively associated with the magnetic member to generate magnetic force directed axially with respect to the direct-moved shaft.

14. A control valve according to claim 6, wherein the direct-moved shaft is provided with a magnetic member and the first body is provided with a solenoid operatively associated with the magnetic member to generate magnetic force directed axially with respect to the direct-moved shaft.

15. A control valve according to claim 7, wherein the direct-moved shaft is provided with a magnetic member and the first body is provided with a solenoid operatively associated to generate magnetic force directed axially with respect to the direct-moved shaft.

16. A control valve in which a direct-moved shaft having one of two ends abutted against a diaphragm which is deformable by fluid pressure, the direct-moved shaft being moved in response to deformation of the diaphragm so that a valve element provided on the other end of the direct-moved shaft is adhered to and separated from an opening edge of a passage, thereby controlling a flow rate of a fluid passing through the passage, the control valve comprising:

a first body enclosing the direct-moved shaft therein;

a second body enclosing the diaphragm therein;

an outer cylinder provided on the first body so that the second body is fitted in the cylinder, the outer cylinder including a cylindrical wall; and a holder provided on the cylindrical wall of the outer cylinder for holding the second body disposed at any location in the outer cylinder.

17. A control valve according to claim 16, wherein the direct-moved shaft includes another shaft extending through a center thereof, and said another shaft has both ends mounted on the first or second body so that said another shaft is direct-moved.

18. A control valve according to claim 16, wherein the direct-moved shaft is provided with a magnetic member and the first body is provided with a solenoid operatively associated with the magnetic member to generate magnetic force directed axially with respect to the direct-moved shaft.

19. A control valve according to claim 17, wherein the direct-moved shaft is provided with a magnetic member and the first body is provided with a solenoid operatively associated with the magnetic member to generate magnetic force directed axially with respect to the direct-moved shaft.

* * * * *